US009241338B2

(12) United States Patent
Tabet et al.

(10) Patent No.: US 9,241,338 B2
(45) Date of Patent: Jan. 19, 2016

(54) LINK ADAPTATION RESUMPTION BASED ON CQI OFFSET

(71) Applicant: Apple Inc., Cupertino, CA (US)

(72) Inventors: Tarik Tabet, Los Gatos, CA (US);
Kee-Bong Song, San Diego, CA (US);
Syed A. Mujtaba, Santa Clara, CA (US); Young Jae Kim, San Jose, CA (US); Navid Damji, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 13/896,202

(22) Filed: May 16, 2013

(65) Prior Publication Data

US 2013/0324145 A1 Dec. 5, 2013

Related U.S. Application Data

(60) Provisional application No. 61/655,992, filed on Jun. 5, 2012.

(51) Int. Cl.
*H04W 72/08* (2009.01)
*H04B 17/21* (2015.01)
*H04L 1/00* (2006.01)
*H04W 76/02* (2009.01)
*H04L 27/00* (2006.01)
*H04L 27/26* (2006.01)
*H04B 7/04* (2006.01)
*H04B 17/24* (2015.01)

(52) U.S. Cl.
CPC ............ *H04W 72/085* (2013.01); *H04B 17/21* (2015.01); *H04L 1/0026* (2013.01); *H04L 1/0027* (2013.01); *H04B 7/0417* (2013.01); *H04B 17/24* (2015.01); *H04L 27/0008* (2013.01); *H04L 27/2601* (2013.01); *H04W 76/028* (2013.01)

(58) Field of Classification Search
CPC ............ H04W 72/085; H04W 72/082; H04W 72/087; H04W 72/08; H04W 72/10; H04W 4/00
USPC ......... 455/63.1, 67.13, 67.14, 69, 114.2, 135, 455/226.3
See application file for complete search history.

(56) References Cited

U.S. PATENT DOCUMENTS

| 8,218,526 B2 | 7/2012 | Bertrand et al. | |
| 2005/0207367 A1* | 9/2005 | Onggosanusi ........ | H04L 1/0003 370/315 |
| 2011/0250919 A1 | 10/2011 | Barbieri et al. | |
| 2012/0155398 A1 | 6/2012 | Oyman et al. | |
| 2012/0201226 A1 | 8/2012 | Sambhwani et al. | |
| 2013/0033989 A1* | 2/2013 | Barbieri ................ | H04L 1/0003 370/242 |
| 2013/0121272 A1* | 5/2013 | Barbieri ................ | H04W 72/08 370/329 |

FOREIGN PATENT DOCUMENTS

WO 2010086156 A1 8/2010

* cited by examiner

*Primary Examiner* — Chuong A Ngo
(74) *Attorney, Agent, or Firm* — Downey Brand LLP

(57) ABSTRACT

Methods, apparatuses and computer readable media are described that adjust signaling messages that include channel quality metrics communicated between a mobile wireless device and a wireless access network before and/or after interruption of a connection to improve downlink performance after resumption of the connection. One or more adjusted channel quality metrics are determined and communicated to the wireless access network to compensate at least in part for an estimate of communication channel performance degradation by a network element of the wireless access network following the interruption and resumption of the connection between the mobile wireless device and the wireless access network.

20 Claims, 9 Drawing Sheets

LINK ADAPTATION RESUMPTION BASED ON CQI OFFSET

CROSS-REFERENCE TO RELATED APPLICATIONS

This application claims the benefit of U.S. Provisional Application No. 61/655,992, filed Jun. 5, 2012 and entitled "LINK ADAPTATION RESUMPTION BASED ON CQI OFFSET," and which is incorporated by reference herein in its entirety for all purposes.

TECHNICAL FIELD

The described embodiments generally relate to methods and apparatuses for managing radio connections between mobile wireless devices and one or more wireless networks. More particularly, the present embodiments describe lower layer signaling management between a mobile wireless device and a wireless network upon resumption of transmission following a connection interruption.

BACKGROUND

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of mobile wireless devices. Mobile wireless devices can include hardware and software to support wireless connections to different types of wireless networks that use different wireless communication technologies. A representative wireless network can include simultaneous support for the Third Generation Partnership Project (3GPP) Long Term Evolution (LTE) wireless communication protocol and the Third Generation Partnership Project 2 (3GPP2) CDMA2000 1x (also referred to as 1xRTT or 1x) wireless communication protocol. This representative "simultaneous" wireless network can support circuit switched voice connections through a first wireless access network that uses the CDMA2000 1x wireless communication protocol and packet switched connections (voice or data) through a second wireless access network that uses the LTE wireless communication protocol. The 3GPP wireless communications standards organization develops mobile communication standards that include releases for Global System for Mobile Communications (GSM), General Packet Radio Service (GPRS), Universal Mobile Telecommunications System (UMTS), LTE and LTE Advanced standards. The 3GPP2 wireless communications standards organization develops mobile communication standards that include CDMA2000 1xRTT and 1xEV-DO standards. While a dual network mobile wireless device that includes support for both CDMA2000 1x and LTE is described as a representative device herein, the same teachings can be applied to other mobile wireless devices that can operate in dual (or more generally multiple) wireless communication technology networks. In particular, the teachings disclosed herein can pertain to mobile wireless devices that switch transceivers from one wireless technology to another wireless technology and back again. The teachings provided herein can also apply to mobile wireless devices that operate under widely varying communication channel conditions using a single wireless technology, e.g., when a mobile wireless device encounters a deep fade that interrupts transmission and/or reception between the mobile wireless device and a wireless access network.

Dual chip mobile wireless devices can include separate signal processing chips that each can support a different wireless communication protocol, such as a signal processing chip for a CDMA2000 1x wireless network and another signal processing chip for a LTE wireless network. In particular, in a dual chip mobile wireless device, each signal processing chip can include its own receive signal processing chain, including in some instances multiple receive antennas and attendant signal processing blocks for each signal processing chip. With separate radio frequency receive signaling chains available to each signal processing chip in the dual chip mobile wireless device, pages can be received independently from two different wireless networks, such as from the CDMA2000 1x wireless network and from the LTE wireless network, by the dual chip mobile wireless device. Even when the dual chip mobile wireless device is connected and actively transferring data through one of the signal processing chips to one of the wireless networks, such as the LTE wireless network, the dual chip mobile wireless device can also listen for and receive a paging message through the other parallel signal processing chip from a second wireless access network, such as the CDMA2000 1x wireless network. Thus, the dual chip mobile wireless device can establish a mobile device originating or mobile device terminating circuit switched voice connection through the CDMA2000 1x wireless network while also being actively connected to (or simultaneously camped on) a packet switched LTE wireless network. Dual chip mobile wireless devices, however, can consume more power, can require a larger physical form factor and can require additional components (and cost more) than a more integrated "single chip" mobile wireless device.

A single chip mobile wireless device, at least in some configurations, can include a signal processing chip that can support different wireless communications protocols but can be unable to be actively connected to a first wireless access network and to receive communication from a second wireless access network simultaneously. The single chip mobile wireless device can support multiple wireless communication technologies, such as connections to a CDMA2000 1x wireless network and to an LTE wireless network, but only to one wireless network at any given time. The single chip mobile wireless device can be limited to receiving signals that use one wireless communication technology type at a time, particularly when multiple antennas are used to receive signals for a single communication technology that supports receive diversity. In a representative embodiment, a single chip mobile wireless device is able to connect to or camp on an evolved Universal Mobile Telecommunications System (UMTS) Terrestrial Radio Access Network (eUTRAN) of the LTE wireless network and also to connect to or camp on a radio access network (RAN) of the CDMA2000 1x wireless network, but not to both wireless networks simultaneously. The single chip mobile wireless device can be registered on both the LTE wireless network and on the CDMA2000 1x wireless network and can therefore form connections with each wireless network singly but not simultaneously. The single chip mobile wireless device can be connected on the LTE wireless network and can interrupt the connection to the LTE wireless network to maintain registration on the CDMA2000 1x wireless network. During the interrupted connection, control signaling and responses to received transmissions between the mobile wireless device and the wireless access network portion of the LTE wireless network can be interrupted. Upon resumption of the connection to the LTE wireless network by the mobile wireless device, downlink transmissions can be restricted to lower data rates by the wireless access network than can be supported by the communication channel signal quality characteristics, as the base station of the wireless access network can interpret the interrupted connection as a poor quality connection. The mobile wireless device is able to receive higher data rates than allocated by the wireless access network, however, the base station of the wireless access network can assign lower data rates to the mobile wireless device for a period of time, thereby unnecessarily penalizing downlink performance to the mobile wireless device. Thus, there exists a need to compensate for connection interruptions between a mobile wireless device and a wireless access network to improve performance of connections upon resumption of the connection.

This application describes methods by which a mobile wireless device can operate in a multiple wireless network environment and/or a time varying single network environment and optimize throughput performance after connection interruptions between the mobile wireless device and an access network portion of a wireless network.

SUMMARY OF THE DESCRIBED EMBODIMENTS

Broadly speaking, the described embodiments relate to managing radio resources and connections between mobile wireless devices and one or more wireless networks. More specifically, methods, apparatuses and computer readable media are described that adjust signaling messages between a mobile wireless device and a wireless network before and/or after a connection interruption to improve downlink performance.

In an embodiment, a method to report channel quality metrics by a mobile wireless device to a first wireless access network is described. The method includes at least the following steps executed by the mobile wireless device. The mobile wireless device determines an unadjusted channel quality metric based at least in part on a signal quality measured at the mobile wireless device for one or more signals received over a connection from the first wireless access network. The mobile wireless device detects an interruption of the connection between the mobile wireless device and the first wireless access network followed by a resumption of the connection between the mobile wireless device and the first wireless access network. The mobile wireless device determines a channel quality metric adjustment value. The mobile wireless device computes an adjusted channel quality metric based on the unadjusted channel quality metric and the channel quality metric adjustment value. The mobile wireless device transmits the adjusted channel quality metric over the connection to the first wireless access network. In a representative embodiment, the adjusted channel quality metric includes a channel quality indicator (CQI), a rank indicator (RI), or both.

In another embodiment, a mobile wireless device is described. The mobile wireless device includes at least one or more processors, a transmitter and one or more receivers. The one or more processors are configured to control establishing and releasing connections between the mobile wireless device and a first wireless access network and a second wireless access network. The transmitter is configured to transmit signals to the first wireless access network according to a first wireless communication protocol and to the second wireless access network according to a second wireless communication protocol. The one or more receivers are configured to receive signals from the first and second wireless access networks. The one or more processors are further configured to determine an unadjusted channel quality metric based at least in part on a signal quality for one or more signals received by the mobile wireless device from the first wireless access network. The one or more processors are also configured to configure the one or more receivers to receive signals from the second wireless access network for a pre-determined period of time. The one or more processors are further configured to re-configure the one or more receivers of the mobile wireless device from the second wireless access network to receive signals from the first wireless access network. The one or more processors of the mobile wireless device are also configured to determine a channel quality metric adjustment value and to compute an adjusted channel quality metric based on the unadjusted channel quality metric and the determined channel quality metric adjustment value. The one or more processors are configured to provide the adjusted channel quality metric to the transmitter to send to the first wireless access network. In a representative embodiment, the one or more processors of the mobile wireless device determine the channel quality metric adjustment value based at least in part on the pre-determined period of time for an interruption of the connection to the first wireless access network.

In another embodiment, a computer program product encoded as computer program code in a non-transitory computer readable medium for reporting channel quality metrics from a mobile wireless device to a first wireless access network is described. The computer program product includes at least the following computer program code. Computer program code for determining an unadjusted channel quality metric based at least in part on a signal quality measured at the mobile wireless device for one or more signals received over a connection from the first wireless access network. Computer program code for detecting an interruption of the connection between the mobile wireless device and the first wireless access network followed by a resumption of the connection between the mobile wireless device and the first wireless access network. Computer program code for determining a channel quality metric adjustment value. Computer program code for computing an adjusted channel quality metric based on the unadjusted channel quality metric and the channel quality metric adjustment value. Computer program code for transmitting the adjusted channel quality metric over the connection to the first wireless access network. In a representative embodiment, the computer program code determines the channel quality metric adjustment value at least in part based on estimating a maximum penalty applied by a network element of the first wireless access network to an allocation of transmission resources in the downlink direction to the mobile wireless device.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
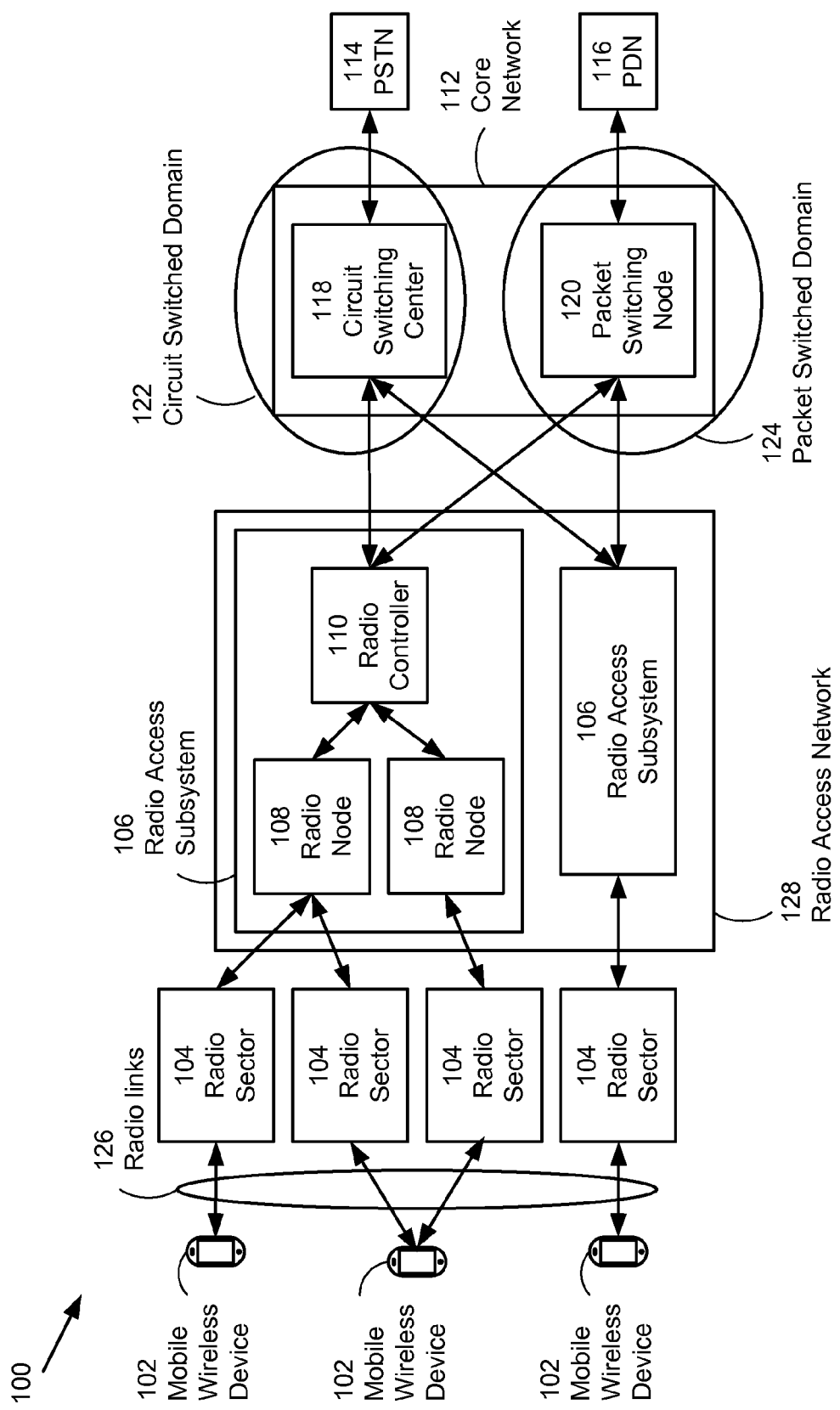
FIG. 1 illustrates components of a generic wireless communication network.

Wireless networks continue to evolve as network operators deploy equipment for new wireless communication technologies based on ongoing standardization efforts. Mobile wireless devices can provide capabilities to communicate with wireless networks based on two or more different wireless communication technologies, e.g. GSM and UMTS, UMTS and LTE, or CDMA2000 1x and LTE, as newer wireless network technologies offer advanced capabilities in parallel with earlier wireless network technologies that can provide greater geographic area coverage and/or varying wireless service implementations. Different wireless communication technologies can require different hardware and software processing to transmit and receive wireless signals, and a mobile wireless device can include multiple, separate signal processing chips to encode and decode wireless signals according to the different wireless communication technologies. A dual chip mobile wireless device, for example, can include one chip for a CDMA2000 1x wireless network and a second chip for an LTE wireless network. With sufficient parallel analog hardware, the dual chip mobile wireless device can communicate with one or both of the wireless networks simultaneously. Dual chip mobile wireless devices, however, can be more complex, larger, more costly and more power intensive than single chip mobile wireless devices. In some embodiments, a single chip mobile wireless device can provide a simpler, smaller, more cost effective and more power efficient mobile wireless device than a dual chip mobile wireless device. The single chip mobile wireless device can communicate with one wireless network at a time out of multiple wireless networks and can provide limited (if any) simultaneous connection capabilities for other parallel wireless networks.

It should be understood that implementations of the same methods and apparatuses described herein can apply to mobile wireless devices that operate in different types of wireless networks, particularly one or more wireless networks that offer connections using two or more different generations or types of wireless communication protocols. For example, the same teachings can be applied to a combination of GSM and UMTS networks, LTE and UMTS networks, LTE and CDMA2000 1x networks or other "combined" multiple radio access technology (multi-RAT) wireless networks. A specific example and implementation described herein in relation to CDMA2000 1x-RTT and LTE wireless networks is presented for simplicity, but the methods and apparatuses disclosed herein can also apply equally to other wireless network environments that use other combinations of wireless access communication protocols. The methods and apparatuses described herein can apply to mobile wireless devices in which a connection to a wireless access network is interrupted and then later resumed. Interruption of the connection between the mobile wireless device and the wireless access network can occur when the mobile wireless device switches one or more receivers to operate on a second wireless access network, e.g., to listen for signaling messages from the second wireless access network, thereby interrupting a connection to the first wireless access network. Interruption of the connection to a wireless access network can also occur when a mobile wireless device encounters an extended time interval with poor signal receive signal quality, e.g., during a deep multi-path signal fade. Upon resumption of a connection between the mobile wireless device and the wireless access network, e.g., in response to switching a receiver back to a first wireless access network (from a second wireless access network) or to improved signal quality reception by the mobile wireless device, a downlink data allocation by the wireless access network to the mobile wireless device can be lower than can be supported based on receive signal conditions at the mobile wireless device. The mobile wireless device can report signal quality to the wireless access network, but the wireless access network can downgrade the reported signal quality based on the interruption of the connection to the mobile wireless device. In the embodiments disclosed herein, the mobile wireless device can determine and communicate signaling message information to the wireless access network to compensate for the perception of poor downlink signal quality by the wireless access network and thereby improve downlink performance, e.g., achieve higher allocations of data in the downlink direction from the wireless access network to the mobile wireless device.

In some embodiments described herein, a single chip mobile wireless device can be capable of receiving wireless radio frequency signals from an LTE wireless network or from a CDMA2000 1x wireless network individually but not from both wireless networks simultaneously (or in some instances, with only limited reception capabilities from both wireless networks simultaneously). Initially, the single chip mobile wireless device can be associated with the LTE wireless network, e.g. connected to or camped on the LTE wireless network. The single chip mobile wireless device can be registered simultaneously with both the LTE wireless network and with the CDMA2000 1x wireless network. The single chip mobile wireless device can interrupt a packet switched data connection with the LTE wireless network in order to communicate with the CDMA2000 1x wireless network, e.g., to listen for a page addressed to the mobile wireless device for a mobile terminated circuit switched voice connection to the CDMA2000 1x wireless network. Alternatively, the single chip mobile wireless device can interrupt the connection with the LTE wireless network in order to communicate with the CDMA2000 1x wireless network to maintain registration of the mobile wireless device on the CDMA2000 1x wireless network. The single chip mobile wireless device can suspend a packet switched data connection with the LTE wireless network in order to communicate with and/or listen to the CDMA2000 1x wireless network; however, a higher layer radio resource connection, such as a connection for signaling between the single chip mobile wireless device and the LTE wireless network, can remain undisturbed during the suspension of the packet switched data connection. (In some embodiments, the LTE wireless network can be unaware that the mobile wireless device suspended communication and can observe a gap in communication between the LTE wireless network and the mobile wireless device.) The single chip mobile wireless device can tune a receiver (with one or more antennas) contained therein away from the LTE wireless network and to the CDMA2000 1x wireless network to listen for paging messages from the CDMA2000 1x wireless network or to transmit signaling messages to the CDMA2000 1x wireless network. The single chip mobile wireless device can subsequently re-tune the receiver back to the LTE wireless network. Interruption of the packet switched data connection (and of a parallel higher layer signaling connection) to the LTE wireless network can be accommodated without the LTE wireless connection being dropped, e.g., when the interruption is less than any timer expiration limits that would precipitate dropping the connection with the mobile wireless device. Active data transfer between the LTE wireless network and the single chip mobile wireless device as well as signaling messages during the suspension period can be interrupted and later resumed when the mobile wireless device returns to the LTE wireless network. During the interruption, the LTE wireless network can send data packets to the mobile wireless device and can receive no acknowledgement (ACK) messages or any negative acknowledgement (NACK) messages in response, and as a result, the LTE wireless network can interpret the interruption as an indication of poor downlink performance of the communication channel between the LTE wireless access network and the mobile wireless device. In some embodiments, the mobile wireless device can encounter a deep multi-path fade that also interrupts communication between the LTE wireless network and the mobile wireless device for a period of time. During the loss of connection between the mobile wireless device and the LTE wireless network, the LTE wireless network can receive no signaling messages, e.g., including those that carry channel quality information or packet acknowledgement responses, and as a result the LTE wireless network can downgrade the estimated performance of the downlink to the mobile wireless device.

When the connection between the mobile wireless device and the LTE wireless network resumes, the LTE wireless network can penalize downlink performance to the mobile wireless device based on the temporary loss of the previous connection between the mobile wireless device and the LTE wireless network. The mobile wireless device can report downlink communication channel signal quality information to the LTE wireless network, e.g., by sending channel quality indicator (CQI) reports, but the LTE wireless network can adjust an estimate of the channel quality for the communication channel to the mobile wireless device downward based on the connection loss, e.g., by estimating a higher block error rate for the present connection as a result of packet loss that occurred during the path connection loss. The LTE wireless network, due to a perceived high block error rate, can penalize the downlink performance from the LTE wireless network to the mobile wireless device unnecessarily until the block error rate estimated by the LTE wireless network improves, e.g., as a result of receiving acknowledgements confirming successful packet reception by the mobile wireless device following resumption of the interrupted connection to the mobile wireless device. To compensate for the downgrade by the LTE wireless network, the mobile wireless device can temporarily upgrade signal quality information sent to the LTE wireless network, e.g., by sending CQI reports with higher values and/or a combination of adjusted CQI report values and higher rank indicator (RI) values. The LTE wireless network, in response, can allocate data transmissions in the downlink direction that can be supported by the higher reported signal quality values when the channel quality values are simultaneously adjusted downward by the LTE wireless network due to higher block error rate values that can occur following a temporary connection loss. The mobile wireless device can upgrade the signal quality information before and/or after the connection with the LTE wireless network is interrupted. The amount by which the signal quality information can be adjusted can be based on the type of wireless network and/or communication protocol used by the wireless network to which the mobile wireless device communicates. The amount by which the signal quality information is adjusted and/or the length of time that signal quality information is adjusted (and/or the number of messages communicated containing adjusted signal quality information) can be pre-determined or adaptively adjusted by the mobile wireless device. The mobile wireless device can determine adjustments for signal quality information to send to the LTE wireless network based on an estimate of the length of time of an interruption of the connection to the LTE wireless network or based on other time varying signal characteristics that can affect the performance of the downlink connection from the LTE wireless network to the mobile wireless device.

FIG. 1 illustrates a representative generic wireless network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency channel operating at a selected frequency. Each radio node 108 can generate one or more radio sectors 104 to which the mobile wireless device 102 can connect by one or more radio links 126. In some wireless networks 100, the mobile wireless device 102 can be connected to more than one radio sector 104 simultaneously. The multiple radio sectors 104 to which the mobile wireless device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128. The radio controller 110 and/or the radio nodes 108 can obtain messages from the mobile wireless devices 102 that include indications of signal quality information for the downlink connections from the radio access subsystem's 106 of the radio access network 128 to the mobile wireless devices 102. The radio controller 110 and/or the radio nodes 108 can also monitor characteristics of the connections with the mobile wireless devices 102 to assess the quality of the connections. The radio controller 110 and/or the radio nodes 108 can determine allocations of downlink radio resources to the mobile wireless devices, which can determine downlink data rates to the mobile wireless devices, based at least in part on the signal quality information received from the mobile wireless devices and/or assessments of the connections to the mobile wireless devices 102 by the radio nodes 108 and/or the radio controller 110.

Radio resources that form the radio links 126 in the radio sectors 104 can be shared among multiple mobile wireless devices 102 using a number of different multiplexing techniques, including time division, frequency division, code division, space division and combinations thereof A radio resource control (RRC) signaling connection can be used to communicate between the mobile wireless device 102 and the radio controller 110 in the radio access subsystem 106 of the radio access network 128 including requests for and dynamic allocations of radio resources to multiple mobile wireless devices 102. Suspension of allocation of radio resources to a mobile wireless device 102 can occur without dis-establishing the radio resource signaling connection to the mobile wireless device 102.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
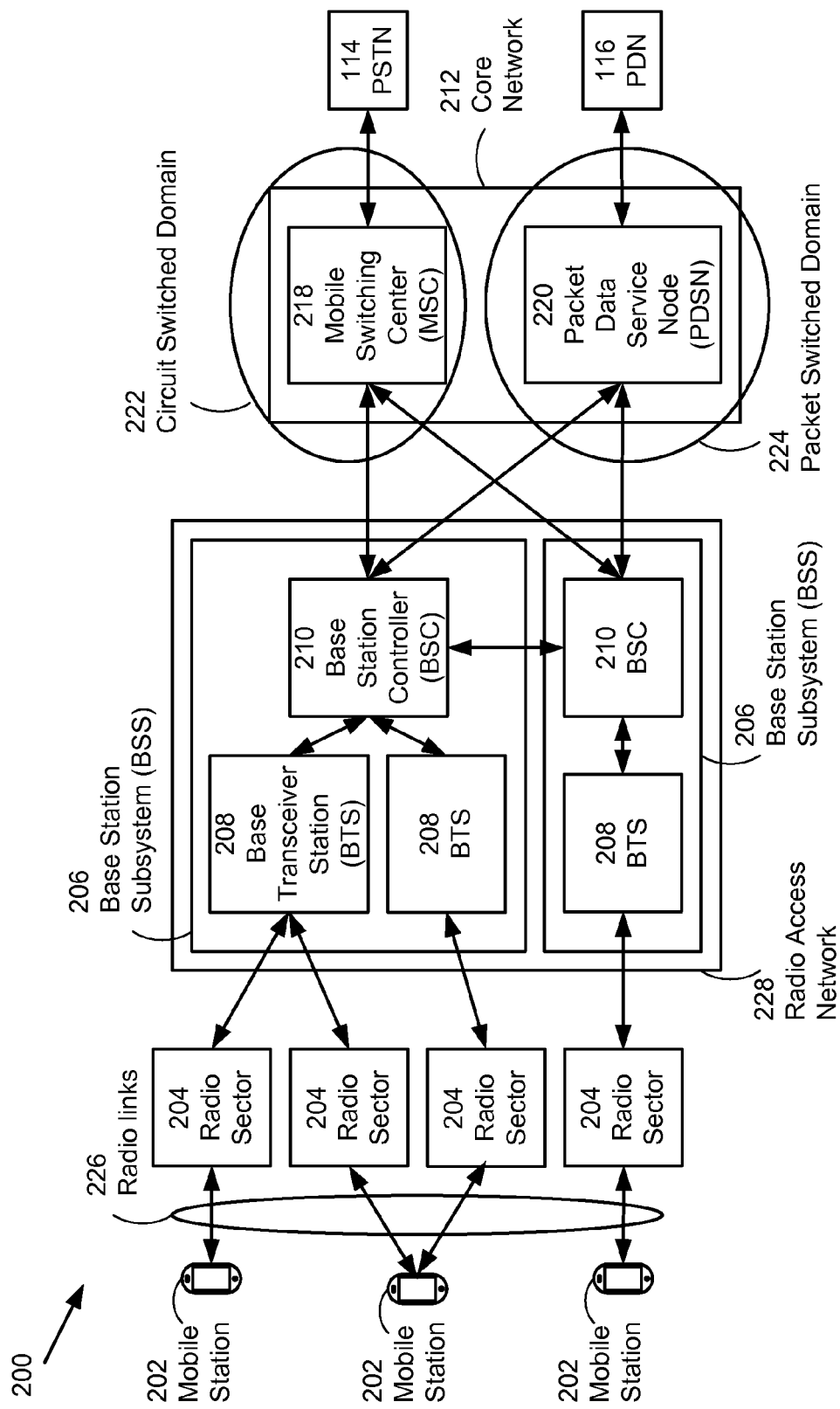
FIG. 2 illustrates components of a CDMA2000 1x (RTT or EV-DO) wireless communication network.

FIG. 2 illustrates a representative CDMA2000 1x wireless network 200 that can include elements comparable to those described for the generic wireless network 100 shown in FIG. 1. Multiple mobile stations 202 can connect to one or more radio sectors 204 through radio frequency links 226. Each radio sector 204 can radiate outward from a base transceiver station (BTS) 208 that can connect to a base station controller (BSC) 210, together forming a base station subsystem (BSS) 206. Multiple base station subsystems 206 can be aggregated to form a radio access network 228. Base station controllers 210 in different base station subsystems 206 can be interconnected. The base station controllers 210 can connect to both a circuit switched domain 222 that use multiple mobile switching centers (MSC) 218 and a packet switched domain 224 formed with packet data service nodes (PDSN) 220, which together can form a core network 212 for the wireless network 200. As with the generic wireless network 100 described above, the circuit switched domain 222 of the core network 212 can interconnect to the PSTN 114, while the packet switched domain 224 of the core network 212 can interconnect to the PDN 116. Establishing connections on the CDMA2000 1x wireless network 200 can depend on the mobile station 202 receiving a page from the BSS 206 indicating an incoming connection. The mobile station 202 can be required to listen for pages during specific paging intervals. Without reception of the page, the mobile station 202 can be unaware of a request to form a connection between the mobile station 202 and the CDMA2000 1x wireless network 200.

Figure 3:
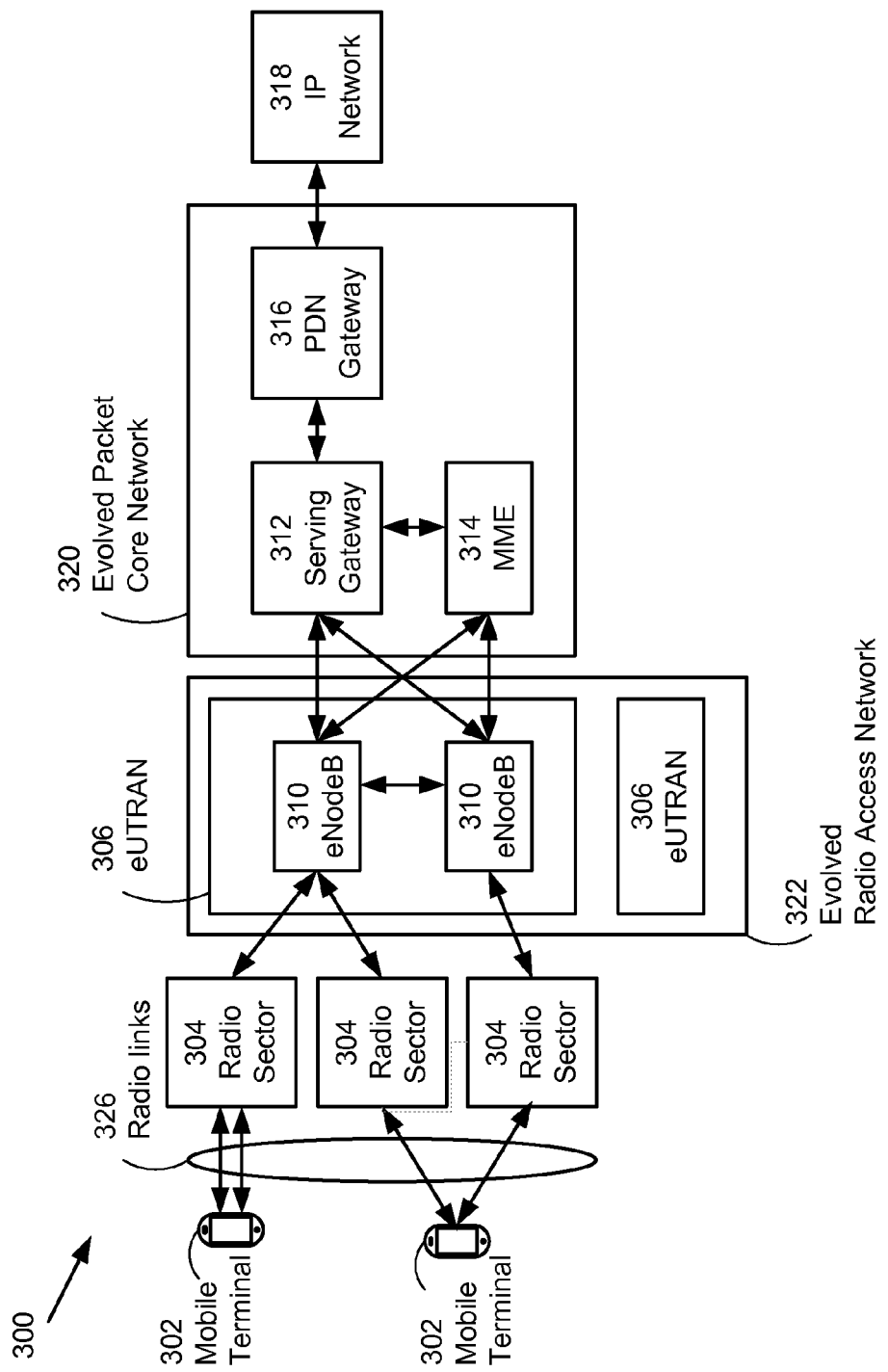
FIG. 3 illustrates components of an LTE (or LTE-Advanced) wireless communication network.

FIG. 3 illustrates a representative Long Term Evolution (LTE) wireless network 300 architecture designed as a packet switched network exclusively. A mobile terminal 302 can connect to an evolved radio access network 322 through radio links 326 associated with radio sectors 304 that emanate from evolved Node B's (eNodeB) 310. The eNodeB 310 includes the functions of both transmitting and receiving base stations (such as the BTS 208 in the CDMA2000 1x wireless network 200) as well as base station radio controllers (such as the BSC 210 in the CDMA2000 1x wireless network 200). The equivalent core network of the LTE wireless network 300 is an evolved packet core network 320 including serving gateways 312 that interconnect the evolved radio access network 322 to public data network (PDN) gateways 316 that connect to external internet protocol (IP) networks 318. Multiple eNodeB 310 can be grouped together to form an eUTRAN 306. The eNodeB 310 can also be connected to a mobility management entity (MME) 314 that can provide control over connections for the mobile terminal 302. The eNodeB 310 can control allocation of radio resources for the radio links 326 to the mobile terminals 302. The eNodeB 310 can determine dynamically an amount of radio resources to allocate to a mobile terminal 302 and a modulation and coding scheme (MCS) to use over connections with each of the mobile terminals 302. Both the amount of radio resources over time and the MCS used with a mobile terminal can vary dynamically based on changes in available resources and measured (and/or estimated) communication channel conditions. The eNodeB 310 can estimate communication channel performance based on information obtained from the mobile terminals 302, based on measurements made by the eNodeB 310, and/or based on estimates of channel performance determined by monitoring the success (or lack thereof) of packet reception by the mobile terminals 302. When communication channel performance to a mobile terminal 302 appears to drop, the eNodeB 302 can elect to assign fewer radio resources and/or lower data rates for connections to the mobile terminal 302. The eNodeB 302 can seek to achieve a particular set of performance characteristics for the radio communication link to a mobile terminal 302, e.g., by setting parameters for the radio communication link to achieve a block error rate at or below a fixed pre-determined level.

Figure 4:
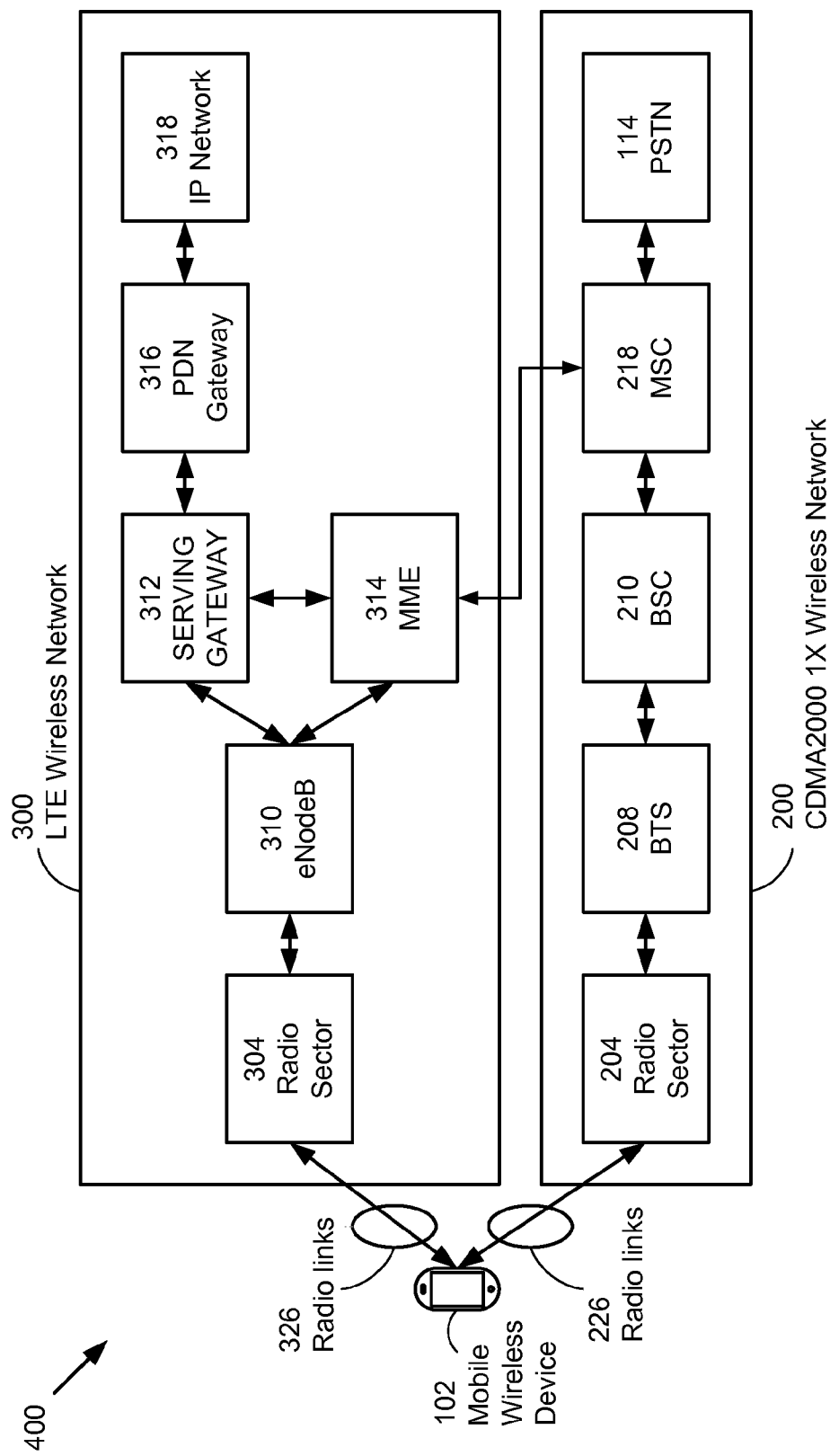
FIG. 4 illustrates a mobile wireless device communicating in parallel to the CDMA2000 1x (RTT or EV-DO) wireless communication network of FIG. 2 and the LTE (or LTE-Advanced) wireless communication network of FIG. 4.

FIG. 4 illustrates a mobile wireless device 102 in communication with both the LTE wireless network 300 and with the CDMA2000 1x wireless network 200. The CDMA2000 1x wireless network 200 can connect to the circuit switch based public switched telephone network (PSTN) 114 through a mobile switching center (MSC) 218. The MSC 218 of the CDMA2000 1x wireless network 200 can be interconnected to the MME 314 of the LTE wireless network 300 to coordinate call signaling for the mobile wireless device 102. In some embodiments, the CDMA2000 1x wireless network 200 can seek to establish a connection through the radio links 226 with the mobile wireless device 102, e.g. to establish a voice connection between the mobile wireless device 102 and the PSTN 114. The CDMA2000 1x wireless network 200 can transmit a page message to the mobile wireless device 102 using the radio links 226 to indicate the availability of an incoming voice connection. Unless a receiver in the mobile wireless device 102 is tuned to listen for the page message from the CDMA2000 1x wireless network 200 during the appropriate paging interval, the mobile wireless device 102 can be connected to the LTE wireless network 300 during the paging interval and can be unaware of the incoming voice connection. A dual chip mobile wireless device 102 can be connected to the LTE wireless network 300 and listen to the CDMA2000 1x wireless network 200 simultaneously, but a single chip mobile wireless device 102 with limited receive capabilities can be only capable of listening to one cellular wireless network at a time. The single chip mobile wireless device 102 can periodically listen for page messages from the CDMA2000 1x wireless network 200 by tuning a receiver from the LTE wireless network 300 to the CDMA2000 1x wireless network 200 temporarily and subsequently re-tuning the receiver back to the LTE wireless network 300. Signaling messages and/or data packets from the LTE wireless network 300 can be dropped while the signal chip mobile wireless device 102 listens for messages from or communicates signaling messages to the CDMA2000 1x wireless network 200. Without receipt of acknowledgement messages for data packets sent to the mobile wireless device 102, the LTE wireless network 300 can conclude that the communication link to the mobile wireless device 102 is unreliable. As a result, when the mobile wireless device returns to communicating over the radio links 326 to the radio sector 304 of the eNodeB 310 of the LTE wireless network 300, the eNodeB 310 can downgrade communications to the mobile wireless device 102 for a period of time. As described further herein, the mobile wireless device 102 can compensate for this undesired behavior of the LTE wireless network 300 by adjusting signal quality information provided to the LTE wireless network 300. In some embodiments, the mobile wireless device 102 can adjust channel quality indicator (CQI) values provided to the LTE wireless network 300. In some embodiments, the mobile wireless device 102 can adjust rank indicator (RI) values and CQI values provided to the LTE wireless network 300. In some embodiments, the mobile wireless device 102 can provide adjusted CQI values and/or adjusted RI values before and/or after an interruption of a connection with the LTE wireless network 300. In some embodiments, the mobile wires device 102 can select adjusted CQI values and/or adjusted RI values based on a length of time of an interruption of a connection with the LTE wireless network. 300. In some embodiments, the mobile wireless device 102 can select adjusted CQI values and/or adjusted RI values based on an estimated Doppler shift for movement of the mobile wireless device 102 relative to the eNodeB 310 of the LTE wireless network 300.

Figure 5:
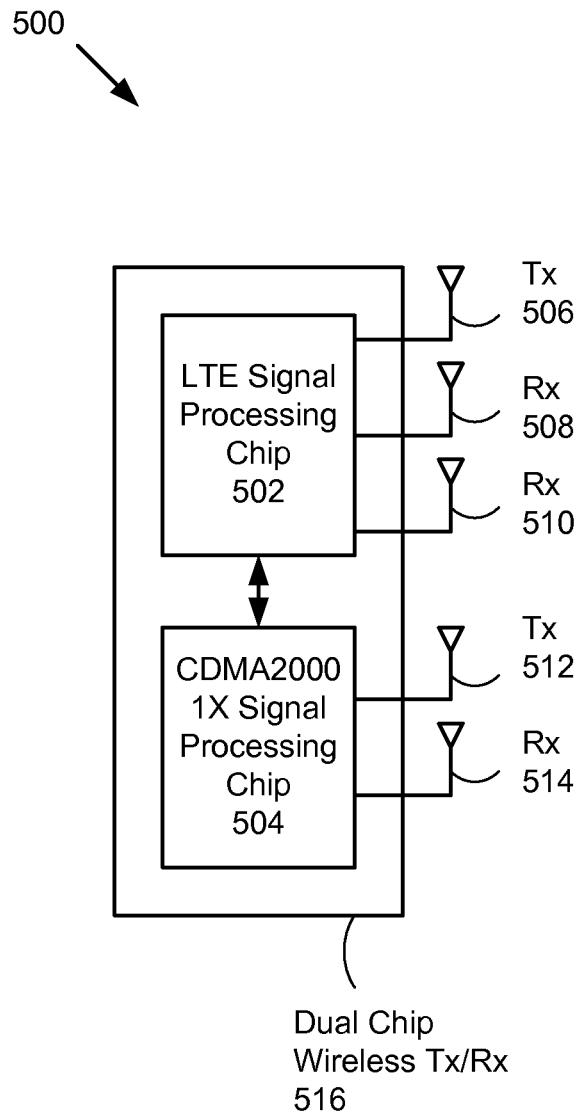
FIG. 5 illustrates elements of a prior art dual signal processing chip mobile wireless device.

FIG. 5 illustrates select wireless signal processing elements 500 that can be contained in a prior art dual chip wireless transmitter/receiver (TX/RX) 516 within a dual chip mobile wireless device 102. An LTE signal processing chip 502 can be used for connections between the dual chip mobile wireless device 102 and the LTE wireless network 300, while a CDMA2000 1x signal processing chip 504 can be used for connections between the dual chip mobile wireless device 102 and the CDMA2000 1x wireless network 200. Each signal processing chip can be connected to a set of antennas through which radio frequency signals can be transmitted and received with respective wireless networks. The LTE signal processing chip 502 can be connected to a transmitting antenna 506 and to a pair of receive antennas 508/510. Multiple receive antennas can be used to improve performance through various forms of receive diversity and can be required based on a standardized wireless communication protocol. With the separate CDMA2000 1x signal processing chip 504, the dual chip mobile wireless device 102 can transmit and receive radio frequency signals with the CDMA2000 1x wireless network 200 through a transmit antenna 512 and a receive antenna 514, while simultaneously transmitting and receiving radio frequency signals with the LTE wireless network 300 through the separate transmit antenna 506 and receive antennas 508/510. The LTE signal processing chip 502 and the CDMA2000 1x signal processing chip 504 can be connected to each other in order to coordinate radio frequency signal communication with their respective wireless networks. The dual chip wireless transmitter/receiver 516, while flexible, can be more expensive, consume more power and occupy more space than a compact, low power single chip wireless transmitter/receiver as shown in FIG. 6.

Figure 6:
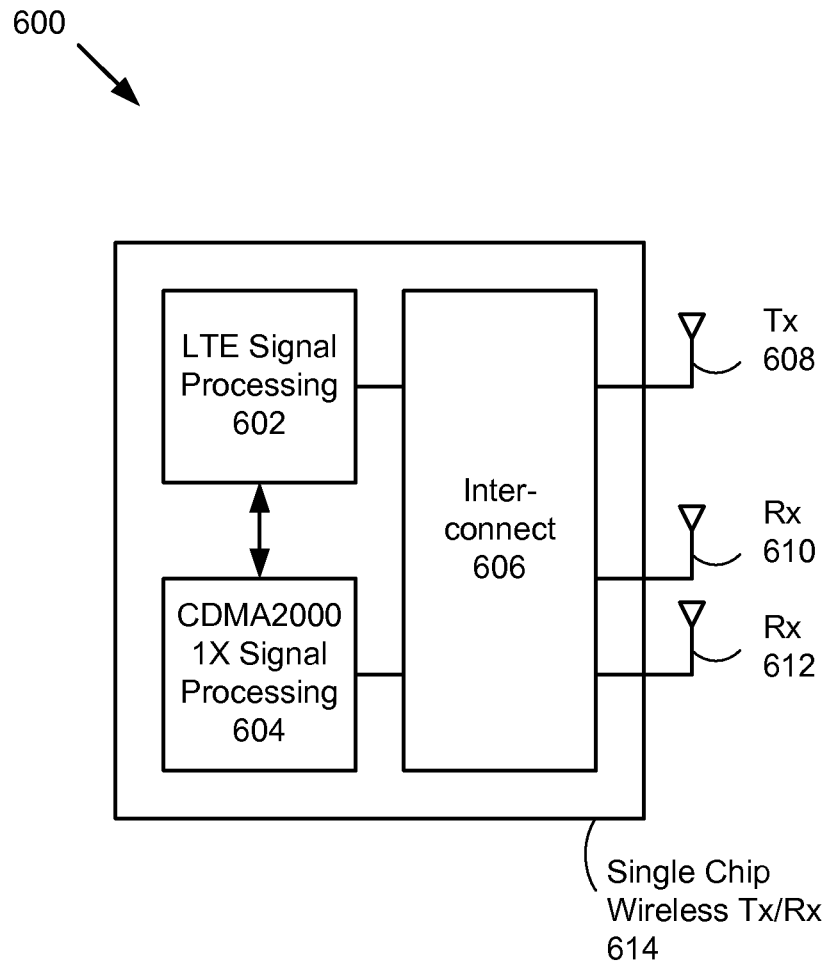
FIG. 6 illustrates elements of a representative single signal processing chip mobile wireless device.

FIG. 6 illustrates a single chip wireless transmitter/receiver 614 that can reside in a single chip wireless mobile wireless device 102 that can communicate with the LTE wireless network 300 or the CDMA2000 1x wireless network 200 separately but not simultaneously. When connected to the LTE wireless network 300, the single chip mobile wireless device 102 can use a single transmitter (Tx) 608 and dual receivers (Rx) 610/612. When connected to the CDMA2000 1x wireless network 200, the single chip mobile wireless device 102 can use the single transmitter 608 and either one receiver (Rx 610 or Rx 612) or dual receivers (Rx 610 and Rx 612). Use of dual receivers for both the LTE wireless network 300 and the CDMA2000 1x wireless network 200 can provide higher receive signal quality and therefore higher data throughput and/or greater connection reliability under adverse signal conditions. An interconnect block 606 can allow either an LTE signal processing 602 block or a CDMA2000 1x signal processing block 604 to transmit and receive radio signals through the transmitter 608 and one or both of the receivers 610/612 respectively. Within the single chip wireless mobile wireless device 102, the single chip wireless transmitter/receiver 614 can be connected to an application processor (not shown) that can perform "higher layer" functions such as establishing connections for applications and forming messages to be communicated with various wireless networks, while the single chip wireless transmitter/receiver 614 can perform "lower layer" functions such as ensuring integrity of transmitted and received radio frequency signals that carry messages for the application processor.

Figure 7:
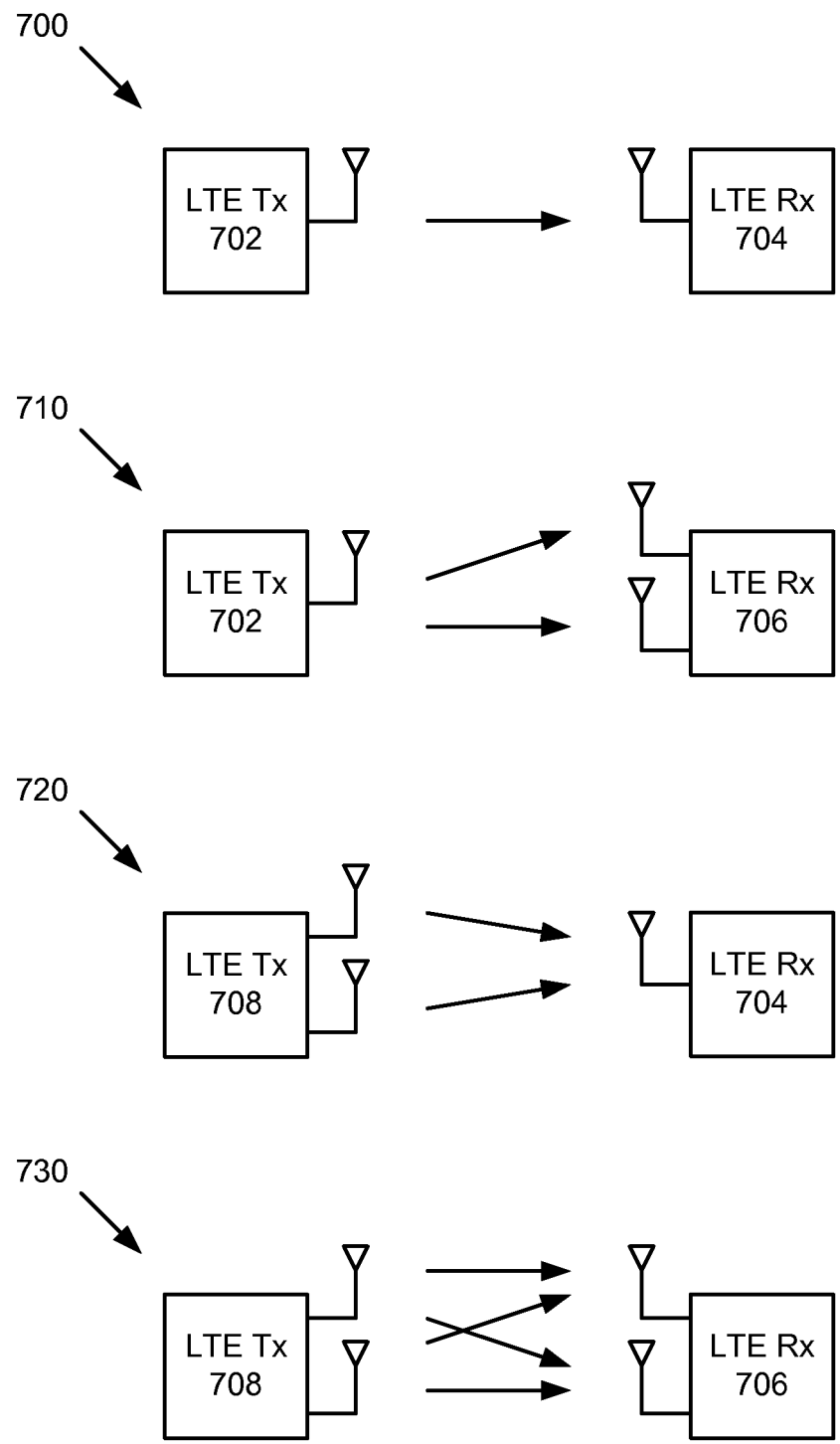
FIG. 7 illustrates several transmission modes using one or more antennas of the mobile wireless device.

FIG. 7 illustrates four different transmission and reception methods that can be used for communication of radio frequency signals between the mobile wireless device 102 and network elements of radio access networks 228/322 of wireless networks 200/300. Multiple transmit and/or receive antennas can be used for transmission signal path diversity to improve performance as well as for spatial multiplexing to increase throughput for communications between the mobile wireless device 102 and the wireless networks 200/300. A single transmitter, single receiver radio frequency channel 700 provides a basic form of communication with one transmitter 702 and one receiver 704 used at each end. A single transmitter, multiple receiver radio frequency channel 710 can provide receive diversity to improve receive signal strength by combining signals received from each of multiple parallel receive antennas at one end. As shown, two different antennas 706 can receive signals from the single transmitter 702. While only two receive antennas are shown in FIG. 7, more than two receive antennas can also be specified by wireless communication protocols and used in advanced mobile wireless devices. Some communication protocols support the use of four or more receive antennas to improve downlink performance to a mobile wireless device 102. A multiple transmitter, single receiver radio frequency channel 720 can provide a form of transmit diversity by sending the same data (although possibly encoded differently) through each of multiple antennas of a transmitter 708. The single antenna receiver 704 can combine information received from each of the two transmit antennas of the transmitter 708 to improve receive signal performance. Finally, a multiple transmitter, multiple receiver radio frequency communication channel 730 can provide for a multiple input multiple output (MIMO) form of communication that can both improve receive signal performance and increase data rates. Parallel data streams can be transmitted by each of the multiple transmitting antennas, and the multiple receiving antennas can separate the received signals to reconstruct the parallel data streams. The use of multiple antennas (including both transmit and receive antennas) can be a critical requirement in advanced wireless communication protocols to increase robustness and achieve higher data transmission rates. In some embodiments, the mobile wireless device 102 can indicate a preference for transmissions from the LTE wireless network 300, e.g., by providing a rank indicator (RI) to the LTE wireless network 300. A higher value for the RI can communicate to the LTE wireless network 300 a preference for increased data transmission rates by using multiple parallel transmit streams as supported by MIMO communication methods. The mobile wireless device 102 can provide channel quality indicator (CQI) values in conjunction with the RI values to the LTE wireless network 300, and the LTE wireless network 300 can use both RI values and CQI values to determine modulation and coding schemes to use for transmissions to the mobile wireless device 102.

In a representative embodiment, a mobile wireless device 102, e.g., including a single chip wireless transceiver 614 or equivalent, can tune the transceiver 614 from a first wireless access network, e.g., an LTE wireless network 300, to a second wireless access network, e.g., a CDMA2000 1x wireless network 200. The mobile wireless device 102 can tune the transceiver temporarily to the second wireless access network from the first wireless access network in order to listen for signaling messages from the second wireless access network, e.g., paging messages, or to communicate with the second wireless access network, e.g., to maintain registration with the second wireless access network. The mobile wireless device 102 can subsequently tune the transceiver back to the first wireless access network. While the mobile wireless device is tuned to the second wireless access network, a connection with the first wireless connection can be interrupted, and data packets transmitted from the first wireless access network to the mobile wireless device 102 can be lost. Communication of signaling messages and acknowledgements in response to data packets received from the first wireless access network can be interrupted and not communicated from the mobile wireless device 102 to the first wireless access network during the period that the mobile wireless device 102 is tuned away from the first wireless access network. Similarly, the mobile wireless device 102 can encounter a long time duration multi-path fade while connected to the first wireless access network, the long multi-path fade causing a loss of communication between the mobile wireless device 102 and the first wireless access network. The loss of communication between the mobile wireless device 102 and the first wireless access network can result in an out of synchronization condition. During an interruption of communication, the first wireless access network can receive no reports from the mobile wireless device 102, e.g., no CQI reports or ACK/NACK messages that can provide signal quality information to the first wireless access network. The mobile wireless device 102 can normally send CQI reports to the first wireless access network based on measurements of downlink signal to interference and noise ratios for signals received at the mobile wireless device 102. The mobile wireless device 102 can map measurements of received signal to interference plus noise ratio (SINR) to CQI values and report the CQI values to the first wireless access network. The first wireless access network can use the reported CQI values to determine settings for communication links to the mobile wireless device 102.

The eNodeB 310 of the LTE wireless network 300 can allocate a particular modulation and coding scheme (MCS) based at least in part on the reported CQI values received from the mobile wireless device 102. The eNodeB 310 can also use measures of packet loss (e.g., block error rates) to also influence selection of an MCS to use for communication with the mobile wireless device 102. As a representative example, the mobile wireless device 102 can measure a "high" SINR value and report a "maximum" CQI value of 15 to the eNodeB 310 of the LTE wireless network 200. The eNodeB 310 can map the CQI value of 15 to an MCS that uses a dense signaling constellation (e.g., 64 QAM) and a relatively high coding rate (>0.5). The combination of higher coding rate and denser constellation can provide for higher data rate transmission to the mobile wireless device 102 by the eNodeB 310. Alternatively, the mobile wireless device 102 can measure a "low" SNR value and report a "minimum" CQI value of 1 to the eNodeB 310 of the LTE wireless network 200, and the eNodeB 310 can map the CQI value of 1 to an MCS that uses a sparse constellation (e.g., QPSK) and a relatively low coding rate (<0.25). The combination of a lower coding rate and sparser constellation can result in lower data rate transmission to the mobile wireless device 102 by the eNodeB 310. In some embodiments, the eNodeB 310 selects an MCS to achieve a target quality of service (QoS) level and/or a particular target block error rate (BLER) value, e.g., less than 10% block error rate. The eNodeB 310 can use receipt of ACK and NACK messages from the mobile wireless device 102 to determine a block error rate for communication with the mobile wireless device 102. An ACK message can indicate the mobile wireless device 102 received a packet and decoded the packet with a correct cyclic redundancy check (CRC). A NACK message can indicate the mobile wireless device 102 received a packet and decoded the packet with an incorrect CRC. The eNodeB 310 can use the ACK/NACK messages received from the mobile wireless device 102 to estimate a BLER for the downlink connection to the mobile wireless device 102. The eNodeB 310 can also use an absence of ACK/NACK messages received from the mobile wireless device 102 after sending data packets to the mobile wireless device 102 to conclude that data packets are lost. Thus, an interrupted connection between the mobile wireless device 102 and the eNodeB 310 can impact an estimate of the BLER determined by the eNodeB 310.

In a representative embodiment, the eNodeB 310 can select an MCS to achieve a target BLER less than a pre-determined value, e.g., less than 10% BLER. When the estimated BLER level achieves the target BLER, the enodeB 102 can select an MCS in accordance with the received CQI values from the mobile wireless device 102. When the estimated BLER level, however, exceeds the target BLER, the enodeB 102 can downgrade the connection by adjusting the received CQI values lower and thereby selecting an MCS that results in a lower data rate (in order to better achieve the target BLER) for downlink communication to the mobile wireless device 102. When the mobile wireless device 102 tunes away from the LTE wireless network 300, the eNodeB 310 can note an absence of ACK/NACK messages from the mobile wireless device 310 and can estimate the BLER value increasing to higher values that can exceed the target BLER value. In some embodiments, for a long "tune-away" time period, the estimated BLER value can reach a maximum value of approximately 100%. In some embodiments, an absence of messages received from the mobile wireless device 102 can be interpreted as a NACK message, and repeated actual (or interpreted) NACKs at the eNodeB 310 can cause the BLER to increase to its maximum value. After the mobile wireless device 102 returns from a "tune-away" with the CDMA2000 1x wireless network 200 to the LTE wireless network 300 (or after a long fade), the eNodeB 310 can continue to estimate that a high BLER exists for the connection to the mobile wireless device 102. The eNodeB 310 can wait until subsequent ACK messages indicate successful reception of data packets before lowering the BLER estimate, and as a result values for the MCS selected in the interim by the eNodeB 310 can be downgraded based on the estimated high BLER value. For example, the mobile wireless device 102 can report a CQI value of 13 following a "tune-away" period that would normally correspond to an MCS value of 23 when the estimated target BLER of 10% can be met. The eNodeB 310, however, can estimate a higher BLER value based on a lack of ACK messages from the mobile wireless device 102 during the tune-away period and penalize downlink communications to the mobile wireless device 102 by selecting a lower MCS value, e.g., an MCS value of 19, to compensate for the higher estimated BLER value. A high estimated BLER value that follows a tune-away by the mobile wireless device 102 or follows a deep multi-path fade can negatively impact subsequent downlink communications to the mobile wireless device 102. A method to reduce the MCS penalty assigned after a return from a tune-away or deep multi-path fade can be desired to improve performance of a data connection between the eNodeB 310 of the LTE wireless network 300 and the mobile wireless device 102.

A particular wireless communications protocol can establish a range of values for signal quality metrics, e.g., for channel quality indicator (CQI) values. The LTE wireless network 300 can use a range of CQI values ranging from 1 to 15 to represent different levels of received SINR (and a zero CQI value for an out of range condition). The CQI can be reported by the mobile wireless device 102 to the eNodeB 310 of the LTE wireless network 300 over a physical uplink control channel (PUCCH) or a physical uplink shared channel (PUSCH). In a representative embodiment, the CQI can be reported by the mobile wireless device 102 to the eNodeB 310 periodically in a control message on the PUCCH. In another representative embodiment, the CQI can be reported in one or more messages over the PUSCH by the mobile wireless device 102 in response to receiving an indication for a signal quality measurement from the eNodeB 310. The eNodeB 310 can select an MCS value based on received CQI values (and on other information gathered to estimate downlink performance) to achieve a target BLER, e.g., less than 10%. The mobile wireless device 102 can measure SINR at its receiver and select a CQI value to report to the eNodeB 310. The selected CQI value can achieve a target BLER, e.g., less than 10%, in the estimation of the mobile wireless device 102. The mobile wireless device 102 can also include a rank indicator (RI) value to recommend a number of parallel spatial multiplexed data streams for the eNodeB 310 to send to the mobile wireless device 102. A mobile wireless device 102 with two receive antennas connected with an eNodeB 310 having two transmit antennas can send RI values of 1 or 2 to indicate one or two parallel data streams, while a mobile wireless device 102 with four receive antennas connected with an eNodeB 310 having four transmit antennas can send RI values of 1, 2, 3 or 4. Both the CQI and RI values can be communicated from the mobile wireless device 102 to the eNodeB 310 together, i.e., a reported CQI value can be paired with an accompanying RI value. As higher RI values can correspond to higher data rates (through the use of parallel data transmission), accompanying CQI values can depend on the accompanying RI value. For example, an RI value of 1 and a CQI value of 15 can correspond to a measured SINR condition that equivalently can be represented by an RI value of 2 and a CQI value of 11. Higher RI values can thus be used with CQI values to extend the effective range of SINR conditions that can be represented to the eNodeB 310.

In some embodiments, the mobile wireless device 102 can report different CQI values and/or RI values to the eNodeB 310 before and/or after a tune-away or a long fade. The mobile wireless device 102 can calculate CQI values based on received SINR values and can compensate by increasing the reported CQI values in advance of a planned tune-away period and/or immediately following a tune-away period (or after detecting return from a deep long fade). The higher reported CQI values can affect the downstream MCS values that the eNodeB 310 selects to use with the mobile wireless device 102 in the time period immediately following the tune-away period (or fade). The mobile wireless device 102 can estimate a penalty that can be imposed by the eNodeB 310 due to the tune-away time period (or a fade), e.g., a reduction in estimated downlink signal quality. As described herein, the eNodeB 310 can downgrade a reported CQI based on an estimate of a BLER value higher than a target BLER. The mobile wireless device 102 can report a higher CQI value to compensate for the expected downgrade and thereby achieve a higher downlink throughput than would otherwise occur. In some embodiments, the mobile wireless device 102 can estimate a maximum penalty value (e.g., 6 dB) that can be imposed and can adjust reported CQI values (e.g., increase by a +3 offset) for a period of time to compensate. In some embodiments, the mobile wireless device 102 can report an adjusted CQI value before a tune-away time period, e.g., in anticipation of the effect that the tune-away can have on the eNodeB 310. In some embodiments, the mobile wireless device 102 can report an adjusted CQI value following the tune-away time period (or following a long deep fade). A value of adjustment applied to the reported CQI values can be based on one or more factors including (1) a duration of the time period of the tune-away, (2) a duration of the time period of a deep fade, (3) an amount of Doppler shift, and/or (4) an estimate of how fast or slow channel conditions are time varying between the mobile wireless device 102 and the eNodeB 310. The mobile wireless device 102 can also determine (1) when to adjust and report different CQI values, (2) by how much to adjust the reported CQI values, and/or (3) for how long to report adjusted CQI values to the eNodeB 310.

When the mobile wireless device 102 measures relatively high SINR values for signals received from the eNodeB 310, a maximum CQI value of 15 can be reached, e.g., during high quality communication channel conditions. As the maximum CQI value of 15 cannot be adjusted higher, the mobile wireless device 102 can adjust a rank indicator value in conjunction with an adjustment to the CQI value to report effectively a higher SINR value. Different combinations of RI values and CQI values can correspond to comparable SINR conditions. For example, a mobile wireless device 102 can report an RI value of 1 and a CQI value of 15 or equivalently an RI value of 2 and a CQI value of 11 or 12 for the same measured SINR condition. By using the RI value of 2 instead of the RI value of 1, the latter for which the CQI value can be capped to the maximum value of 15, the mobile wireless device can adjust the reported CQI value upward from 11 or 12 to a higher value in conjunction with the RI value of 2 to report a higher SINR condition to the eNodeB 310. A higher RI value can provide additional headroom to adjust CQI reported values upward. The mobile wireless device 102 can be capable of supporting either rank 1 or rank 2 transmissions from the eNodeB 310 when reporting an RI value of 2 to the eNodeB 310.

Figure 8:
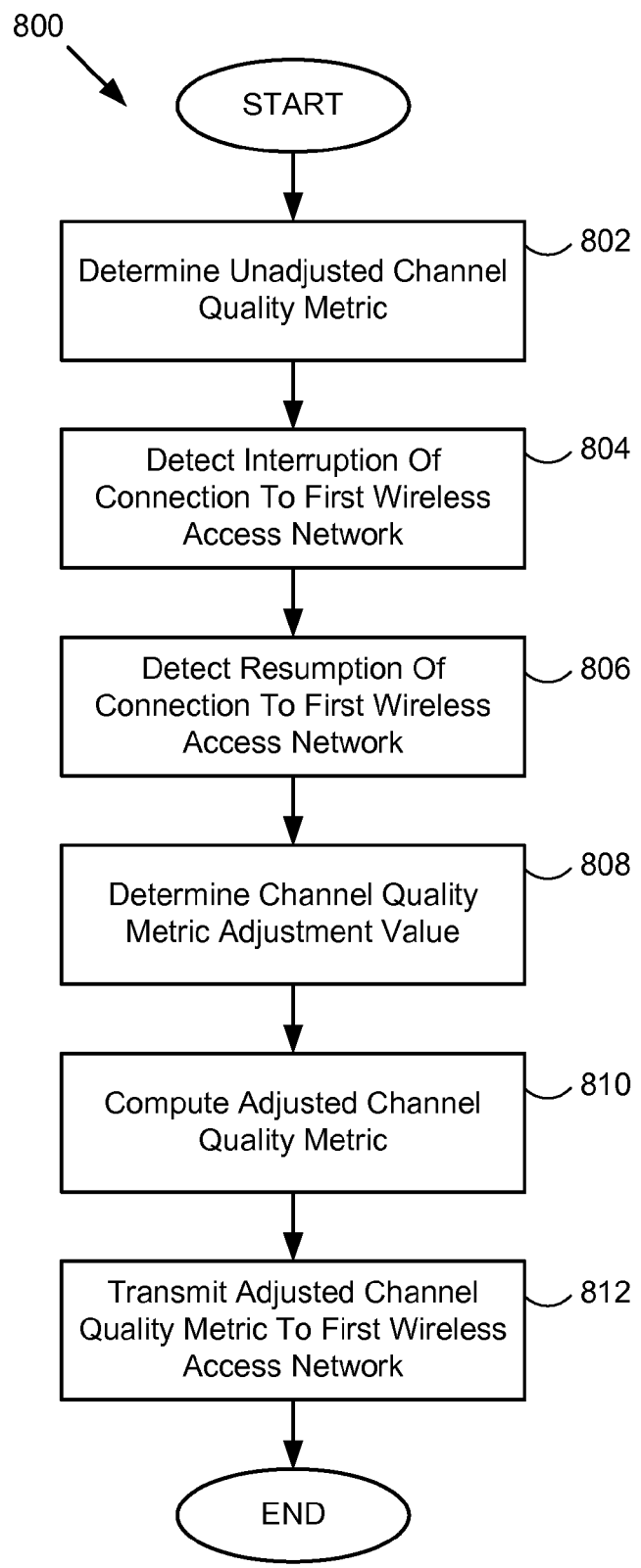
FIG. 8 illustrates a representative method to report channel quality metrics by a mobile wireless device to a wireless access network.

FIG. 8 illustrates a representative method 800 to report channel quality metrics by the mobile wireless device 102 to a first wireless access network. In step 802, the mobile wireless device 102 determines an adjusted channel quality metric based at least in part on a signal quality metric measured at the mobile wireless device 102 for one or more signals received over a connection from the first wireless access network. In some embodiments, the mobile wireless device 102 determines the unadjusted channel quality metric at regular intervals and transmits information about measurements of the channel quality metrics to the first wireless access network. In some embodiments, the mobile wireless device 102 determines the unadjusted channel quality metric by calculating one or more channel quality metric values before detecting an interruption of the connection between the mobile wireless device 102 and the first wireless access network. In step 804, the mobile wireless device 102 detects an interruption of the connection between the mobile wireless device 102 and the first wireless access network. In some embodiments, the mobile wireless device 102 tunes one or more receivers of the mobile wireless device 102 from the first wireless access network to receive signals from or transmit signals to a second wireless access network, thereby initiating the interruption of the connection between the mobile wireless device 102 and the first wireless access network. In some embodiments, the mobile wireless device 102 can receive poor signal quality, e.g., due to a deep multi-path fade, that results in the interruption of the connection between the mobile wireless device 102 and the first wireless access network. The time interval of the interruption of the connection between the mobile wireless device 102 and the first wireless access network can be caused by the deep multi-path fade. In step 806, the mobile wireless device 102 detects resumption of the connection to the first wireless access network. In some embodiments, the mobile wireless device 102 re-tunes the one or more receivers of the mobile wireless device 102 from the second wireless access network back to the first wireless access network, thereby resuming the connection to the first wireless access network. In some embodiments, the length of the time period from the start of the interruption of the connection (when tuning away) to the end of the interruption of the connection (when re-tuning back) can be a pre-determined period of time, e.g., known in advance to the mobile wireless device 102. In some embodiments, the mobile wireless device 102 receives an improved signal quality, e.g., due to exiting a deep fade condition, thereby resuming the connection between the mobile wireless device 102 and the first wireless access network. In step 808, the mobile wireless device 102 determines a channel quality metric adjustment value. In some embodiments, the mobile wireless device 102 determines the channel quality adjustment metric value by estimating a maximum penalty applied by a network element of the first wireless access network to an allocation of transmission resources in the downlink direction to the mobile wireless device 102. In step 810, the mobile wireless device 102 computes an adjusted channel quality metric based on the unadjusted channel quality metric and the channel quality metric adjustment value. In some embodiments, the adjusted channel quality metric includes a channel quality indicator (CQI), a rank indicator (RI), or both. In step 812, the mobile wireless device 102 transmits the adjusted channel quality metric over the connection to the first wireless access network.

In some embodiments, the mobile wireless device 102 calculates the channel quality metric adjustment value based on an estimated downlink block error rate of approximately 100 percent. The mobile wireless device 102 can also calculate the channel quality metric adjustment value based on an estimate of the length of time for the interruption of the connection between the mobile wireless device 102 and the first wireless access network. In some embodiments, the mobile wireless device 102 determines the channel quality metric adjustment value based at least in part on a pre-determined period of time for tuning away from the first wireless access network and re-tuning back to the first wireless access network. The mobile wireless device 102 can estimate an downlink block error rate that can accumulate over time during the interruption of the connection between the mobile wireless device 102 and the first wireless access network, e.g. a downlink block error rate estimated in parallel by a network element of the first wireless access network. The mobile wireless device 102 can calculate the channel quality metric adjustment value to compensate for the estimated downlink block error rate, which the network element of the first wireless access network can use to downgrade signal quality estimates for the connection to the mobile wireless device 102. The mobile wireless device 102 can adjust a reported channel quality indicator (CQI), e.g., increase the CQI value, based on the calculated channel quality metric adjustment. The mobile wireless device 102 can also adjust a rank indicator (RI), e.g., increase the RI value when less than a maximum RI value, in conjunction with reporting a CQI value to the first wireless access network. The mobile wireless device 102 can provide an adjusted RI value and an adjusted CQI value together to the first wireless access network. In some embodiments, the unadjusted channel quality metric can be a maximum CQI value, and the mobile wireless device can increase an accompanying RI value in conjunction with providing a CQI value (adjusted or unadjusted) to the first wireless access network 102. The combination of the CQI value and the adjusted RI value can compensate at least in part for a penalty that the first wireless access network can apply to downlink transmissions, e.g., as a result of estimating a high block error rate when the connection between the mobile wireless device 102 and the first wireless access network is interrupted and then later resumed.

The mobile wireless device 102 can transmit an adjusted channel quality metric, e.g., report adjusted CQI values and/or adjusted RI values, to the first wireless access network one or more times before the interruption of the connection with the first wireless access network and/or one or more times after resumption of the connection with the first wireless access network. The mobile wireless device 102 can transmit at least one adjusted CQI value to the first wireless access network before adjusting a receiver of the mobile wireless device to receive signals from the second wireless access network. In some embodiments, the mobile wireless device 102 can interrupt the connection to the first wireless access network to listen for signaling messages from or to transmit signaling messages to a second wireless access network. When the mobile wireless device 102 controls the interruption of the connection to the first wireless access network, the mobile wireless device 102 can determine one or more adjusted channel quality metrics and transmit the one or more adjusted channel quality metrics to the first wireless access network at least once before the interruption of the connection with the first wireless access network. Upon resumption of the connection with the first wireless access network, the mobile wireless device 102 can transmit adjusted channel quality metrics determined before and/or determined after the interruption of the connection. In some embodiments, the mobile wireless device 102 transmits at least once an adjusted channel quality metric that was determined before the interruption of the connection upon resumption of the connection. The mobile wireless device 102 can subsequently determine and update adjusted channel quality metrics to transmit to the first wireless access network after the connection to the first wireless access network resumes.

When the mobile wireless device 102 controls an interruption of the connection to the first wireless access network, the mobile wireless device 102 can determine an adjustment of channel quality metrics to report to the first wireless access network based on knowledge of a pre-determined time period for the interruption of the connection to the first wireless access network. The mobile wireless device 102 can adjust the channel quality metric at least in part based on the length of the pre-determined time period for the interruption of the connection. In some embodiments, the mobile wireless device 102 can estimate the time period of the interruption of the connection during and/or after resumption of the connection with the mobile wireless device. The mobile wireless device 102 can determine an adjustment to the channel quality metrics based on the estimate of the time period of the interruption. In some embodiments, the mobile wireless device can determine a number of times to transmit an adjusted channel quality metric to the first wireless access network based on the estimated time period of the interruption of the connection. For example, longer interruptions can result in higher estimates of block error rates by the first wireless access network, while shorter interruptions can result in lower estimates of block error rates by the first wireless access network. The mobile wireless device 102 can account for the effect that the length of time of the interruption can impact the estimated block error rate to determine adjustment values for the channel quality metrics and/or the number of times to transmit adjusted channel quality metrics to the first wireless access network based at least in part on the length of time of the interruption (whether known in advance, measured, or estimated by the mobile wireless device 102.) The mobile wireless device 102 can transmit adjusted channel quality metrics for the determined number of times following a resumption of the connection with the first wireless access network. By sending adjusted channel quality metrics repeatedly to the first wireless access network, the mobile wireless device 102 can influence the selection of modulation coding schemes that the first wireless access network assigns to the mobile wireless device 102.

The mobile wireless device 102 can account for a type of communication protocol used for connections between the first wireless access network and the mobile wireless device 102 when determining a channel quality metric adjustment. Different communication protocols can have different ranges of channel quality metric values, can have different correlations of the channel quality metric values to changes in signal quality, can have different algorithms for determining block error rates, and/or can have different algorithms for combining reported channel quality metrics with determined block error rates for determining modulation coding schemes to use for assigning resources in the downlink direction to the mobile wireless device 102. In some embodiments, the mobile wireless device 102 can account for the type of communication protocol used on connections with the first wireless access network to determine the adjusted channel quality metric values and/or a number of times to transmit adjusted channel quality metric values to the first wireless access network. The mobile wireless device 102 can determine at least in part how a lack of acknowledgement (ACK and/or NACK) messages during the interruption of the connection with the first wireless access network can impact a block error rate estimate, which in turn can affect a selection of modulation and coding schemes assigned to the mobile wireless device 102 by the first wireless access network. Until the estimated block error rate returns to a target block error rate, the first wireless access network can penalize transmissions to the mobile wireless device 102, e.g., by downgrading reported channel quality metrics received from the mobile wireless device 102 based on the estimated block error rate. The mobile wireless device 102 can report adjusted channel quality metrics to the first wireless access network to compensate for this downgrading effect caused by the higher estimated block error rates.

Figure 9:
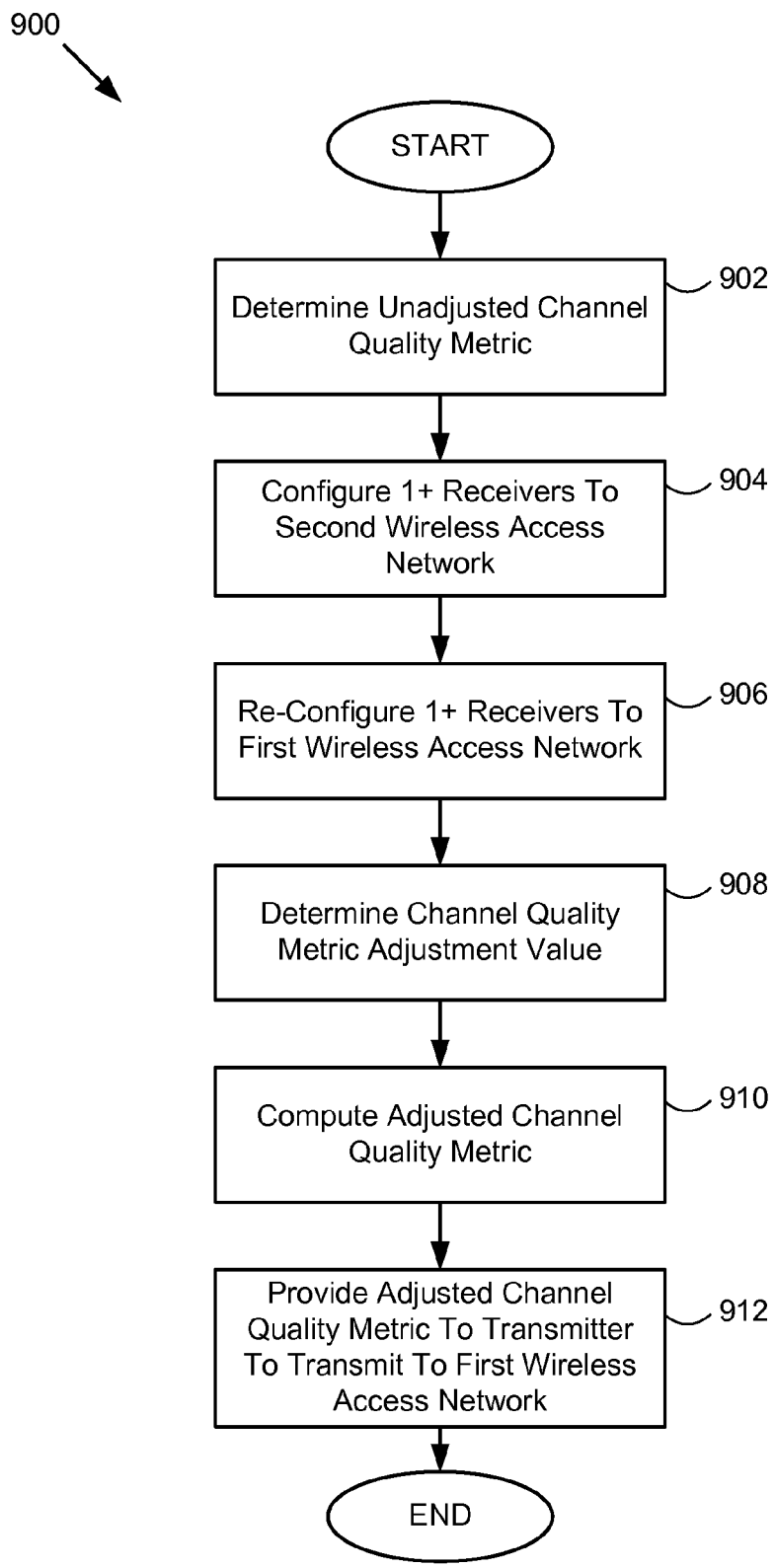
FIG. 9 illustrates another representative method to report channel quality metrics by the mobile wireless device to the wireless access network.

FIG. 9 illustrates another representative method 900 to report channel quality metrics by the mobile wireless device 102 to a first wireless access network. In step 902, the mobile wireless device 102 determines an unadjusted channel quality metric. In step 904, the mobile wireless device 102 configures one or more receivers of the mobile wireless device 102 from the first wireless access network to a second wireless access network. In step 906, the mobile wireless device 102 re-configures the one or more receivers from the second wireless access network back to the first wireless access network. In some embodiments, the length of time that the one or more receivers of the mobile wireless device 102 are configured to receive signals from the second wireless access network is a pre-determined time period. In step 908, the mobile wireless device 102 determines a channel quality metric adjustment value. In some embodiments, the mobile wireless device 102 determines the channel quality metric adjustment value based at least in part on the length of time that the one or more receivers are tuned to the second wireless access network. In step 910, the mobile wireless device 102 computes an adjusted channel quality metric, e.g., based on the unadjusted channel quality metric and the channel quality metric adjustment value. In some embodiments, the channel quality metrics (adjusted and/or unadjusted) are CQI values, RI values, or both. In step 912, the mobile wireless device 102 provides the adjusted channel quality metric to a transmitter in the mobile wireless device 102 to transmit to the first wireless access network. In some embodiments, the mobile wireless device 102 transmits the adjusted channel quality metric at least once before configuring the one or more receivers to the second wireless access network. In some embodiments, the mobile wireless device 102 transmits the adjusted channel quality metric at least once after re-configuring the one or more receivers from the second wireless access network back to the first wireless access network.

The mobile wireless device 102 can include one or more processors configured to control establishing and releasing connections between the mobile wireless device 102 and one or more wireless access networks, including a first wireless access network and a second wireless access network. The mobile wireless device 102 can include a transmitter configured to transmit signals to the first wireless access network according to a first wireless communication protocol and to the second wireless access network according to a second wireless communication protocol. In a representative embodiment, the first wireless communication protocol is an LTE or LTE-Advanced wireless communication protocol, and the second wireless communication protocol is a CDMA2000 1x wireless communication protocol. The mobile wireless device 102 can include one or more receivers configured to receive signals from the first and second wireless access networks. The one or more processors of the mobile wireless device 102 can be configured to determine an unadjusted channel quality metric based at least in part on a signal quality for one or more signals received by the mobile wireless device 102 from the first wireless access network. The mobile wireless device 102 can measure received signal quality, e.g. determining an SINR value, and can communicate signal quality metrics to the first wireless access network, e.g., CQI and/or RI values. In some embodiments, CQI values are transmitted to the first wireless access network as "unadjusted" channel quality metrics. In some embodiments, CQI values are "adjusted" by the mobile wireless device 102 before being transmitted as "adjusted" channel quality metric values to the first wireless access network. The one or more processors of the mobile wireless device 102 can be configured to tune the one or more receivers to receive signals from a second wireless access network and to subsequently re-tune the one or more receivers to receive signals from the first wireless access network. The one or more processors can be configured to tune the receivers to the second wireless access network for a pre-determined period of time, e.g., to overlap with regular paging intervals used by the second wireless access network. The one or more processors of the mobile wireless device 102 can be configured to determine a channel quality metric adjustment value. The channel quality metric adjustment value can depend on the length of time that a connection between the mobile wireless device 102 and the first wireless access network is interrupted, e.g., due to the tuning of the receivers to the second wireless access network. The one or more processors of the mobile wireless device 102 can compute an adjusted channel quality metric based on the unadjusted channel quality metric and the channel quality metric adjustment value. The one or more processors of the mobile wireless device 102 can be configured to provide the adjusted channel quality metric to the transmitter to send to the first wireless access network. The amount of the adjustment applied to the channel quality metric can depend on a number of factors, including the pre-determined period of time that the mobile wireless device 102 is tuned to the second wireless access network. The adjusted channel quality metric can include a CQI value, an RI value, or both. The adjusted channel quality metrics can be communicated to the first wireless access network before and/or after tuning the receivers to the second wireless access network and back to the first wireless access network.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to report channel quality metrics by a mobile wireless device to a first radio access network of a first wireless network, the method comprising:
   by the mobile wireless device:
   determining an unadjusted channel quality metric based at least in part on a downlink signal quality measured at the mobile wireless device for one or more signals received over a connection from the first radio access network;
   detecting an actual or forthcoming interruption of the connection between the mobile wireless device and the first radio access network, during which reception of signals from and/or transmission of signals to the first radio access network are interrupted for a period of time, followed by a resumption of the connection between the mobile wireless device and the first radio access network; and
   in response to detecting the actual or forthcoming interruption of the connection between the mobile wireless device and the first radio access network:
   determining a channel quality metric adjustment value;
   computing an adjusted channel quality metric based at least in part on the unadjusted channel quality metric and the channel quality metric adjustment value; and
   transmitting the adjusted channel quality metric over the connection to the first radio access network.

2. The method recited in claim 1, wherein determining the channel quality metric adjustment value comprises estimating a maximum penalty applied by a network element of the first radio access network due to interruption of the connection for the period of time to an allocation of transmission resources in a downlink direction to the mobile wireless device.

3. The method recited in claim 1, wherein the adjusted channel quality metric comprises a channel quality indicator (CQI), a rank indicator (RI), or both.

4. The method recited in claim 1, wherein determining the channel quality metric adjustment value comprises calculating the channel quality metric adjustment value based on an estimated downlink block error rate of approximately 100 percent incurred during the period of time of the interruption of the connection.

5. The method recited in claim 1, wherein determining the unadjusted channel quality metric comprises calculating one or more channel quality metric values before detecting the interruption of the connection between the mobile wireless device and the first radio access network.

6. The method recited in claim 1, further comprising:
   by the mobile wireless device:
   estimating a length of the period of time between a start of the interruption of the connection and a start of the resumption of the connection between the mobile wireless device and the first radio access network;
   determining a number of times to transmit the adjusted channel quality metric to the first radio access network based on the estimated length of the period of time; and
   wherein transmitting the adjusted channel quality metric to the first radio access network comprises transmitting the adjusted channel quality metric repeatedly for at least the determined number of times over the connection to the first radio access network.

7. The method recited in claim 1, wherein the mobile wireless device determines the channel quality metric adjustment value based at least in part on a particular wireless communication protocol used for the connection between the mobile wireless device and the first radio access network of the first wireless network, the first wireless network operating in accordance with the particular wireless communication protocol.

8. The method recited in claim 1, wherein the unadjusted channel quality metric comprises a maximum CQI value and a particular rank indicator (RI) value less than a maximum RI value, and wherein the adjusted channel quality metric comprises a CQI value and an adjusted RI value greater than the particular RI value.

9. The method recited in claim 1, wherein the period of time between the interruption of the connection and the resumption of the connection between the mobile wireless device and the first radio access network comprises a multi-path fade.

10. The method recited in claim 1, further comprising:
by the mobile wireless device:
estimating a Doppler shift at the mobile wireless device;
determining a number of times to transmit the adjusted channel quality metric to the first radio access network based at least in part on the estimated Doppler shift; and
wherein transmitting the adjusted channel quality metric to the first radio access network comprises transmitting the adjusted channel quality metric repeatedly for at least the determined number of times over the connection to the first radio access network.

11. The method recited in claim 1, wherein transmitting the adjusted channel quality metric to the first radio access network comprises transmitting at least one adjusted CQI value to the first radio access network before adjusting a receiver of the mobile wireless device to receive signals from a second radio access network of a second wireless network, wherein the adjusting the receiver causes the interruption of the connection between the mobile wireless device and the first radio access network of the first wireless network.

12. The method recited in claim 1, wherein transmitting the adjusted channel quality metric to the first radio access network comprises transmitting at least one adjusted CQI value to the first radio access network after adjusting a receiver of the mobile wireless device to receive signals from a second radio access network of a second wireless network and subsequently re-adjusting the receiver of the mobile wireless device to receive signals from the first radio access network of the first wireless network.

13. A mobile wireless device comprising:
one or more processors configurable to control establishing and releasing connections between the mobile wireless device and a first radio access network of a first wireless network and a second radio access network of a second wireless network;
a transmitter configurable to transmit signals to the first radio access network of the first wireless network in accordance with a first wireless communication protocol used by the first wireless network and to the second radio access network of the second wireless network in accordance with a second wireless communication protocol used by the second wireless network; and
one or more receivers configurable to receive signals from the first radio access network of the first wireless network and from the second radio access network of the second wireless network;
wherein the one or more processors are configured to cause the mobile wireless device to:
determine an unadjusted channel quality metric based at least in part on a downlink signal quality for one or more signals received from the first radio access network of the first wireless network;
configure the one or more receivers to receive signals from the second radio access network of the second wireless network for a pre-determined period of time thereby interrupting reception of signals from the first radio access network of the first wireless network;
re-configure the one or more receivers from the second radio access network of the second wireless network back to receive signals from the first radio access network of the first wireless network;
determine a channel quality metric adjustment value;
compute an adjusted channel quality metric based at least in part on the unadjusted channel quality metric and the channel quality metric adjustment value; and
send the adjusted channel quality metric to the first radio access network of the first wireless network.

14. The mobile wireless device recited in claim 13, wherein the one or more processors determine the channel quality metric adjustment value based at least in part on a duration of the pre-determined period of time.

15. The mobile wireless device recited in claim 13, wherein the adjusted channel quality metric comprises a channel quality indicator (CQI), a rank indicator (RI), or both.

16. The mobile wireless device recited in claim 13, wherein the mobile wireless device sends the adjusted channel quality metric to the first radio access network of the first wireless network at least once before configuring the one or more receivers to receive signals from the second radio access network of the second wireless network and at least once after re-configuring the one or more receivers from the second radio access network of the second wireless network back to receive signals from the first radio access network of the first wireless network.

17. The mobile wireless device recited in claim 13, wherein computing the adjusted channel quality metric comprises increasing the unadjusted channel quality metric by the channel quality metric adjustment value to compensate for an estimated penalty applied by a network element of the first radio access network due to connection interruption for the pre-determined period of time to an allocation of transmission resources in a downlink direction to the mobile wireless device.

18. The mobile wireless device recited in claim 13, wherein the one or more processors are further configured to cause the mobile wireless device to send the adjusted channel quality metric to the first radio access network repeatedly for a number of times based at least in part on a duration of the pre-determined period of time.

19. The mobile wireless device recited in claim 13, wherein the one or more processors are further configured to cause the mobile wireless device to:
estimate a Doppler shift at the mobile wireless device; and
determine the channel quality metric adjustment value at least in part based on the estimated Doppler shift.

20. A non-transitory computer-readable medium storing instructions for reporting channel quality metrics by a mobile wireless device to a first radio access network of a first wireless network, the instructions, when executed by one or more processors of the mobile wireless device, causing the mobile wireless device to:
determine an unadjusted channel quality metric based at least in part on a downlink signal quality measured at the mobile wireless device for one or more signals received over a connection from the first radio access network;
detect an actual or forthcoming interruption of the connection between the mobile wireless device and the first radio access network during which reception of signals from and/or transmission of signals to the first radio access network are interrupted for a period of time, followed by a resumption of the connection between the mobile wireless device and the first radio access network; and
in response to detecting the actual or forthcoming interruption of the connection between the mobile wireless device and the first radio access network:
determine a channel quality metric adjustment value;

compute an adjusted channel quality metric based at least in part on the unadjusted channel quality metric and the channel quality metric adjustment value; and transmit the adjusted channel quality metric over the connection to the first radio access network.

* * * * *